United States Patent [19]

Anderson et al.

[11] 4,279,059

[45] Jul. 21, 1981

[54] CARCASS CLEANING UNIT

[75] Inventors: Maynard E. Anderson, Hallsville; Robert T. Marshall, Columbia; William C. Stringer, Rocheport, all of Mo.

[73] Assignee: The United States of America as represented by the Secretary of Agriculture, Washington, D.C.

[21] Appl. No.: 94,539

[22] Filed: Nov. 15, 1979

[51] Int. Cl.³ ............................................. A22B 5/00
[52] U.S. Cl. ........................................ 17/51; 17/1 R; 17/14; 17/65
[58] Field of Search ................ 17/1 R, 14, 15, 51, 17/65

[56] References Cited

U.S. PATENT DOCUMENTS

| 2,132,634 | 10/1938 | Kurt | 17/14 X |
| 2,562,556 | 7/1951 | Kurt | 17/1 R X |
| 3,178,763 | 4/1965 | Kolman | 17/15 X |
| 3,288,109 | 11/1966 | Smith et al. | 118/316 |
| 3,674,211 | 7/1972 | Gage et al. | 239/247 |
| 3,953,226 | 4/1976 | Emond et al. | 134/104 |

FOREIGN PATENT DOCUMENTS 1283697  11/1968  Fed. Rep. of Germany .............. 17/15

OTHER PUBLICATIONS

Anderson et al., Journal of Food Science 40: 1232–1235, 1975.

Primary Examiner—Willie G. Abercrombie
Attorney, Agent, or Firm—M. Howard Silverstein; David G. McConnell; Curtis P. Ribando

[57] ABSTRACT

Animal carcasses are thoroughly cleaned by a single pass through a cleaning unit having a pair of oscillating spray bar assemblies, each equipped with a plurality of nozzles arranged to collectively contact all exposed surfaces of the carcass.

5 Claims, 3 Drawing Figures

CARCASS CLEANING UNIT

BACKGROUND OF THE INVENTION

1. Field of the Invention

After the slaughter of meat animals, various foreign materials, including blood, bone dust, hair, dirt, fecal matter, and contaminating microorganisms are generally adhered to the carcass surfaces. Certain microorganisms are capable of growing and causing spoilage at refrigeration temperatures and some may be pathogenic. Of course, carcasses must be substantially free of all such foreign material in order to exceed the minimum Governmental regulatory standards and to be acceptable for market. This invention relates to a system for effectively cleaning meat animal carcasses prior to refrigeration.

2. Description of the Prior Art

In the smaller slaughterhouse operations, it is conventional for carcasses to be washed with a stream of water emitted from a handheld nozzle. This technique is not particularly effective insofar as areas are sometimes missed and the single stream has a tendency to shift the foreign material from one area to another without actually removing it from the surface. Larger operations have incorporated washing units wherein the carcasses are passed through the spray emitted from a series of opposed stationary nozzles. Alternatively, in U.S. Pat. No. 3,674,211, F. H. Gage et al. shows a washer in which banks of spray nozzles are oscillated up and down as the carcasses pass through. These automated devices frequently fail to satisfactorily clean the carcasses and often require a manual spraying operation as a backup.

The effects of water volume, line pressure, angle of droplet impact, mean droplet size, total force of spray, and speed of travel through the spray on red meat have been previously reported by Anderson et al. [J. Food Sci. 40: 1232–1235 (1975)]. While this publication indicates that the proper selection of physical spray factors is critical to effective removal of microorganisms from a meat surface, a suitable apparatus for removing nearly 100% of all forms of contaminants from an irregularly shaped carcass surface has heretofore not been suggested.

SUMMARY OF THE INVENTION

We have now discovered an apparatus for thoroughly and automatically cleaning carcasses of slaughtered animals. The carcasses are conveyed by a conventional overhead rail and hook system between a pair of vertically oriented spray bars oscillating about their vertical axes. Each spray bar is equipped with an array of nozzles designed to produce fan-shaped spray patterns which apply a substantially uniform force per unit of surface area. These patterns are arranged to collectively contact all areas of the carcass as the oscillating bars laterally sweep back and forth. The effect is for foreign matter and microorganisms to be pushed from the surface by the advancing spray.

In accordance with this discovery, it is an objective of the invention to provide a carcass cleaning system which will automatically remove virtually all contaminating matter from the exposed surfaces of slaughtered animals.

It is also an object of the invention to provide a carcass cleaning unit which can be readily installed in existing abattoir facilities.

Another object of the invention is to provide a carcass cleaning system which is mechanically simple and relatively inexpensive to install and operate.

Other objects and advantages of this invention will become readily apparent from the ensuing description.

DETAILED DESCRIPTION OF THE INVENTION

In the ensuing disclosure, the invention will be described in terms of treating halved beef carcasses, for which the instant automated apparatus was predominantly designed. However, it will be understood that the invention may also be used to wash the carcass of any animal, whether it be whole or sectioned, skinned or unskinned.

In a conventional slaughterhouse operation, the sacrificed animal is hooked through the hock and conveyed to each processing station on an overhead rail system. After skinning, disembowelment, and halving, the carcass is ready to be washed. Our novel device will now be described as it relates to this step.

Figure 1:
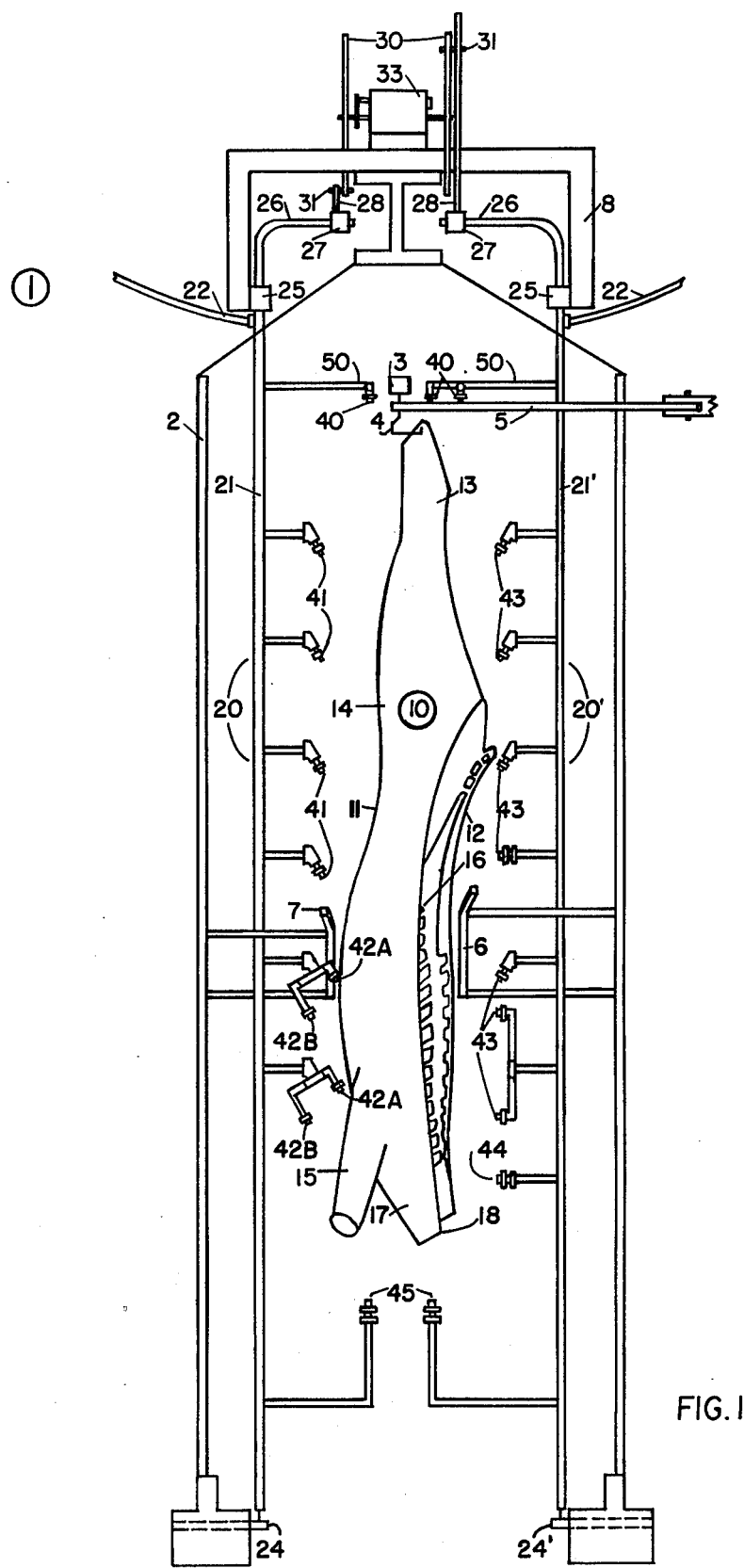
FIG. 1 is a front elevation view of the instant carcass cleaning unit.
Figure 2:
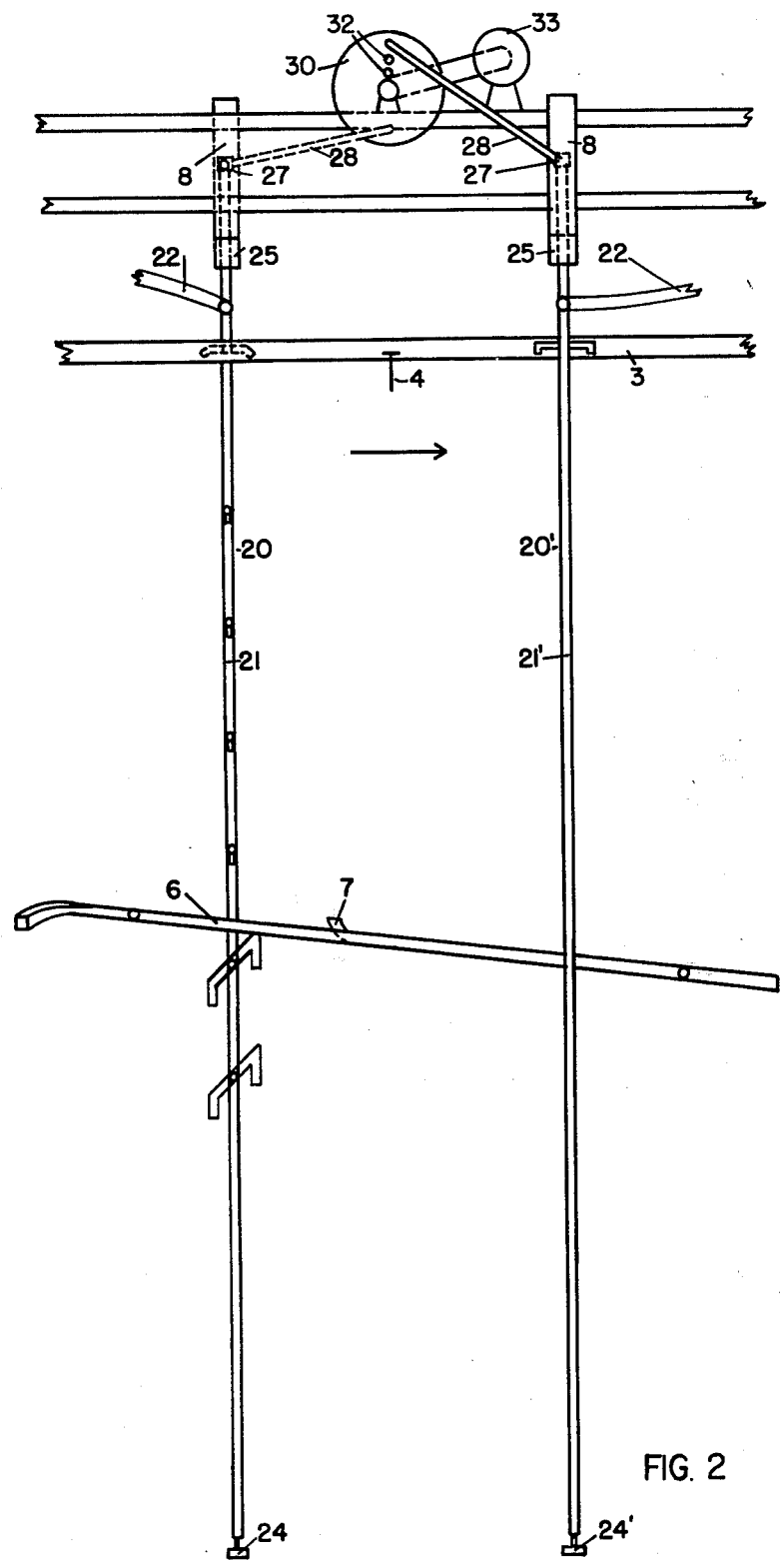
FIG. 2 is a side elevation view of the carcass cleaning unit.

Referring to FIGS. 1 and 2, the carcass cleaning unit is generally indicated by numeral 1. It will normally include a chamber enclosure 2 of any conventional design for containing the emitted water spray. Passing through the top center of the enclosure is rail 3 and hook 4 for supporting the carcass 10 by its hock 13.

Mounted in the interior of the enclosure are a pair of spray bar assemblies 20 and 20' comprising spray bars 21 and 21', respectively, each bar fitted with an array of nozzles. The bars are not directly opposite one another with respect to the conveyor rail, but rather are offset a sufficient distance to prevent the spray pattern of one assembly from substantially impacting on the spray pattern of the other assembly. The spray bar assemblies are similarly supported by means of lower bearings plates 24 and upper bearings 25 mounted on frame 8. The upper end of each bar is connected to a lateral extension 26 which is journalled by a bearing 27 to pitman arm 28. The pitman arm is drivably linked to crank wheel 30 through crank pin 31. The throw of the arm and the arc of spray bar assembly oscillation can be varied by repositioning the pin 31 in any of the crank arm adjustment holes 32. Both crank wheels 30 are driven by a variable speed motor 33.

The spray bars are fed by water or other suitable cleansing fluid through flexible hoses 22 which are sufficiently pliable so as not to hinder the oscillatory movement of the bars. The water is then conducted through the bars to the above-mentioned arrays of spray nozzles. Generally, the nozzles are all designed to emit a flat, or planar, fan-shaped spray pattern which applies a substantially uniform force per unit area across the entire surface area it contacts. The angle defined by the spray pattern, the angle of impingement on the carcass surface, and the flow capacity of each nozzle is specifically selected for the area to be cleaned. Additionally, the nozzles of each spray bar assembly are arranged so that the fan-shaped spray patterns emitted therefrom collectively form a composite spray pattern which directs foreign matter downwardly and off the carcass surface as it sweeps laterally across. The composite pattern is not necessarily a linear arrangement of the individual fan-shaped patterns, but it is necessary that the individual patterns be substantially contiguous. The cooperative oscillatory motion of the two spray bar assemblies together with the forward movement of the carcass through the cleaning unit permit all outwardly exposed surfaces, including the coelomic cavity 16, to be contacted with the cleansing fluid.

A typical nozzle arrangement for effectively cleaning a half beef carcass is illustrated in FIG. 1. Bar assembly 20 is designed specifically for cleaning the flesh side 11 of the carcass and bar assembly 20' is for cleaning the bone side 12. It is understood that these assemblies may be interchanged, provided that all carcasses enter the unit with their sides oriented toward the appropriate spray assemblies. A plurality of hock nozzles 40 extend out from spray bars 21 and 21' toward the middle of the unit on junctions 50 a sufficient distance to permit them to pass almost directly over the carcass. They are oriented between 60° and 90°, and preferably between 70° and 75° from the horizontal and the spray pattern therefore will collectively contact all parts of hock 13. On the flesh side, the flank nozzles 41 are located on the spray bar assembly 20 at the level of the flank or plate 14 between the hock and the shank. They are oriented at an angle between about 15° and 70° from horizontal and preferably at about 45°. On the same side below the flank nozzles are shank nozzles 42A and 42B. These are positioned at an angle of from 45° to 88° from the horizontal and are used to clean the shank 15 and the crevice area between the shank and the body. Nozzles 42A tend to clean the crevice area on the right carcass half while nozzles 42B tend to clean the crevice area on the left carcass half. The nozzles 43 on the bone side below the hock are oriented anywhere from about 0°-90° from horizontal and are canted to either side so as to apply the spray directly into the crevices of the coelomic cavity 16. Near the level of the neck region 17, nozzle 44 points approximately horizontally in order to direct the spray onto the slightly undercut contours below the shoulder. Finally, nozzles 45 below the neck are directed upwardly at an angle of 60° to 90° from the horizontal for contacting the severed neck area 18.

In operation, the carcass halves are positioned on the rail and hook system so that they will enter the cleaning unit with the sides facing the appropriate spray bar assemblies. As the carcass enters the unit, it triggers lever 5, which activates both the pump system (not shown) for supplying water to hoses 22 and also variable speed motor 33 for oscillating the spray bar assemblies. While the crank wheels and spray bar assemblies have been depicted as being 180° out of phase, the degree of phase differential is not considered to be critical, and may in fact be zero. Due to the offset positioning of the assemblies 20 and 20', the spray pattern from assembly 20 impacts on the flesh side of the body 11 before the spray from assembly 20' impacts on the bond side 12. The effect is that the carcass is forced against guide rail 6 and is retained in its proper orientation as it proceeds through the unit. By the time that the bone side is contacted with the spray from the bar 21', the carcass is wedged between guide rails 6 and 7 and cannot be reoriented by an imbalance in spray forces.

Figure 3:
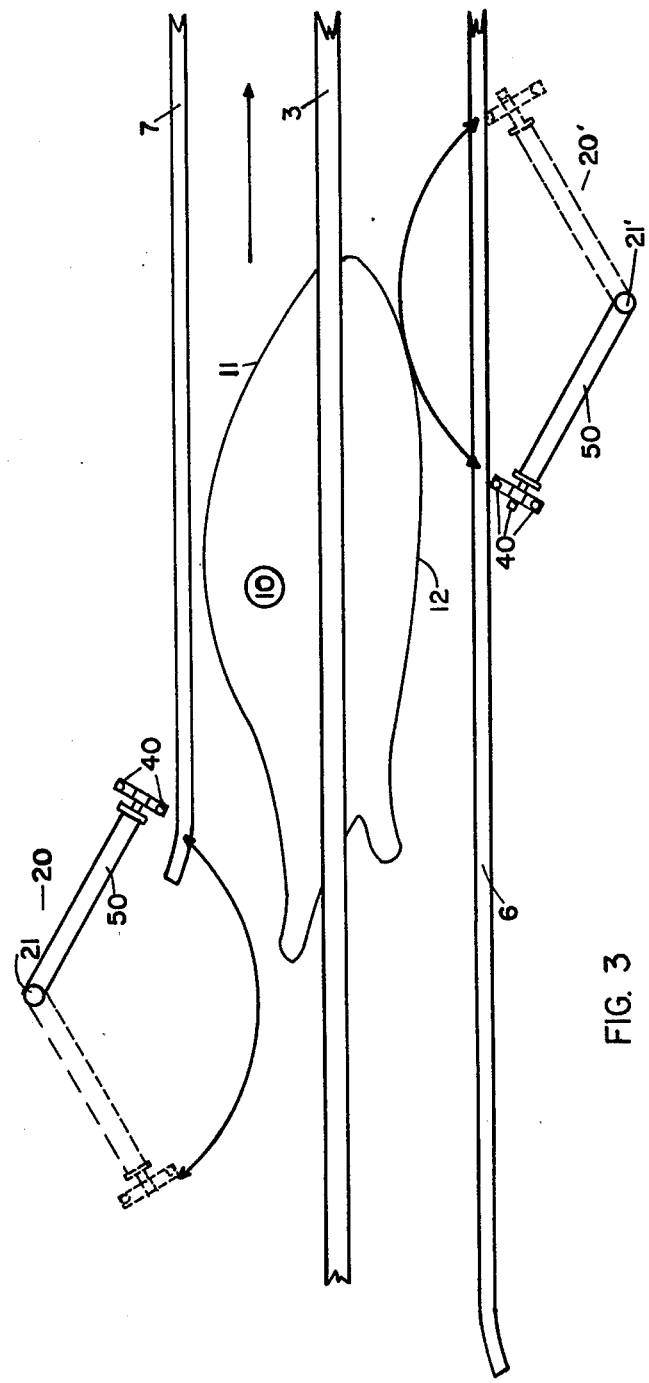
FIG. 3 is a top view of the spray bar assemblies showing only the hock nozzles.

For most applications, the oscillating mechanism is adjusted to rotate each spray bar assembly through an arc in the range of approximately 90°-180° (see FIG. 3). The speed of the motor is selected relative to the speed of the conveyor rail to insure that virtually all exposed surface areas of the carcass are subjected at least once to the sweeping action of the spray. As noted in FIG. 2, the guide rails are sloped at a sufficient angle so that they do not protect the same portion of the carcass from the spray throughout its passage through the unit.

For effective cleaning, the nozzle pressure of the water applied to the carcasses should be in the range of 7-35 kg./cm.$^2$ gauge (100-500 p.s.i.g.) with the preferred values being in the range of 12-21 kg./cm.$^2$ gauge (170-300 p.s.i.g.). The water temperature is not especially critical and may vary from tap water temperature up to about 45° C. The flow rate for each nozzle may range from 23-135 l./min. (5-30 gal./min.). To prevent bacteria and other contaminants from being driven into the skin, appropriate nozzles should be selected to produce relatively large spray droplets. The median droplet diameter should be at least 250 microns and are preferably in the range of from about 250 to about 1000 microns. Under these conditions, all foreign material including hair, dirt, bone dust, fecal matter, and dried blood are removed from the carcass in a period of about 5-30 sec. Optimum values within these ranges can be readily determined by a person in the art and will be dependent upon factors such as a type of animal, slaughter procedure, and the dryness of the carcass surface prior to washing.

The following examples are intended only to further illustrate the invention and are not intended to limit the scope of the invention which is defined by the claims.

EXAMPLE 1

A. Control.

Twenty beef cattle were slaughtered, halved, and then washed with unheated tap water emitted from a conventional handheld nozzle at a pressure of 12.3 kg./cm.$^2$ gauge (175 p.s.i.g.) and a flow rate of 26.5 l./min. (7 gal./min.) for a period of 3.5 min. per two half carcasses. Three areas of each of the 40 carcass halves, the hock, the plate, and the shank were checked for bacterial count, dirt, hair, and fecal smears before and after washing.

B. Experimental.

Twenty beef cattle were slaughtered, halved, and then washed in the carcass cleaning unit of this invention using unheated tap water at a pressure of 21 kg./cm.$^2$ gauge (300 p.s.i.g.) and a cummulative flow rate of 290 l./min. (75 gal./min.). The median droplet size ranged from about 265 to about 775 microns. Three areas of each of the 40 carcass halves, the hock, the plate, and the shank were checked for bacterial count, dirt, hair, and fecal smears before and after washing.

The results of Examples 1A and 1B are shown below in Table I.

TABLE I

| Example | Washing treatment | Contaminant | Percent reduction | | |
|---|---|---|---|---|---|
| | | | Hock | Plate | Shank |
| 1A | hand nozzle | bacteria | 0.9 | 75.6 | −107.0 |
| | | dirt | 92.6 | 91.7 | 87.3 |
| | | hair | 86.3 | 76.8 | 94.9 |
| | | fecal smears | 100.0 | 100.0 | 97.3 |
| 1B | carcass | bacteria | 73.9 | 60.1 | 52.3 |

TABLE I-continued

| Example | Washing treatment | Contaminant | Percent reduction | | |
|---|---|---|---|---|---|
| | | | Hock | Plate | Shank |
| | cleaning unit | dirt | 90.2 | 94.9 | 97.8 |
| | | hair | 11.2 | 74.5 | 98.5 |
| | | fecal smears | 100.0 | 100.0 | 100.0 |

EXAMPLE 2

The 80 carcass halves from Examples 1A and 1B above were subjected to an acceptable quality level (AQL) inspection in accordance with USDA Food Safety and Quality Service Standards both before and after washing. Overall dirt, hair, and fecal smear levels for each carcass half were categorized as critical, major, or minor. The results are shown in Table II below. All carcasses from both washing treatments were within acceptable quality specifications.

TABLE II

| Washing treatment | Contaminant | AQL (Percentage of total carcass halves subjected to designated washing treatment) | | | | | |
|---|---|---|---|---|---|---|---|
| | | Before wash | | | 24 Hr. after wash | | |
| | | Critical | Major | Minor | Critical | Major | Minor |
| hand nozzle | dirt | 57.5 | 25.0 | 17.5 | 0.0 | 0.0 | 0.0 |
| | hair | 47.5 | 52.5 | 0.0 | 0.0 | 0.0 | 12.5 |
| | fecal smears | 87.5 | 12.5 | 0.0 | 0.0 | 0.0 | 0.0 |
| carcass cleaning unit | dirt | 50.0 | 17.5 | 25.0 | 0.0 | 0.0 | 7.5 |
| | hair | 45.0 | 47.5 | 7.5 | 0.0 | 2.5 | 22.5 |
| | fecal smears | 70.0 | 20.0 | 10.0 | 0.0 | 0.0 | 0.0 |

It is understood that the foregoing detailed description is given merely by way of illustration and that modification and variations may be made therein without departing from the spirit and scope of the invention.

We claim:

1. An apparatus for cleaning carcasses of slaughtered animals for use in combination with a conventional overhead rail and hook carcass conveyor system, said apparatus comprising:
    a. a first spray bar assembly adapted for positioning on one side of said conveyor system and a second spray bar assembly adapted for positioning on the other side of said conveyor system, wherein said first and second spray bar assemblies each comprise a vertically-oriented spray bar and an array of spray nozzles adjustably mounted on said spray bar, wherein each of said spray nozzles is adapted for emitting a planar, fan-shaped spray pattern which applies a substantially uniform force per unit area across the entire carcass surface area it contacts, and wherein said array of spray nozzles is arranged such that a plurality of said fan-shaped spray patterns are substantially contiguous, thereby producing a composite spray pattern which directs foreign matter downwardly and off the surface of said carcass as it sweeps laterally across said carcass; and
    b. means for synchronously oscillating said first and second spray bar assemblies about the vertical axes of said respective spray bars, wherein said composite spray pattern produced by each of said spray bar assemblies is swept laterally across said carcass.

2. The apparatus as described in claim 1 wherein said second spray bar is positioned along said conveyor system from said first spray bar a distance to prevent the composite spray pattern from said first spray bar assembly from impacting on the composite spray pattern from said second spray pattern, and vice versa.

3. The apparatus as described in claim 1 and further comprising first and second carcass guiding rails positioned between said first and second spray bar assemblies and spaced apart from one another a distance sufficient to permit passage of said carcass therebetween, wherein said guiding rails are further characterized by being sloped from the horizontal an amount sufficient to permit exposure of all surface areas of said carcass to at least one or the other of said composite spray patterns.

4. A method for cleaning the carcass of a slaughtered animal supported by the hock on a hook of a conventional overhead rail and hook carcass conveyor system, comprising passing said carcass by means of said conveyor system through a spraying zone, and contacting said carcass from each of two opposite sides of said zone with a composite liquid spray pattern formed by a plurality of substantially contiguous, planar, fan-shaped liquid spray patterns which apply a substantially uniform force per unit area across the entire carcass surface area they contact, wherein each of said composite spray patterns is oscillated about a vertical axis and is adapted for directing foreign matter downwardly and off the surface of said carcass as it sweeps laterally across said carcass.

5. The method as described in claim 1 wherein the composite spray patterns from said two opposite sides are applied to said carcass in a sequential relationship.

* * * * *